United States Patent [19]

Egawa et al.

[11] Patent Number: 5,349,487
[45] Date of Patent: Sep. 20, 1994

[54] FLOATING MAGNETIC HEAD WITH A HEAD CORE-REINFORCING PORTION

[75] Inventors: Motoji Egawa; Akio Takayama, both of Shizuoka, Japan

[73] Assignee: Minebea Co., Ltd., Nagano, Japan

[21] Appl. No.: 51,550

[22] Filed: Apr. 26, 1993

[30] Foreign Application Priority Data

Aug. 28, 1992 [JP] Japan .................. 4-254168

[51] Int. Cl.⁵ ............................. G11B 5/60
[52] U.S. Cl. ............................. 360/103
[58] Field of Search ................. 360/103–104

[56] References Cited

U.S. PATENT DOCUMENTS

| | | | |
|---|---|---|---|
| 4,814,920 | 3/1989 | Yamano et al. | 360/104 X |
| 5,091,810 | 2/1992 | Kakizaki et al. | 360/103 |
| 5,136,444 | 8/1992 | Maki et al. | 360/103 |

FOREIGN PATENT DOCUMENTS

| | | | |
|---|---|---|---|
| 62-281117 | 12/1987 | Japan | 360/103 |
| 63-52317 | 3/1988 | Japan | 360/103 |
| 63-113921 | 5/1988 | Japan | 360/103 |

Primary Examiner—John H. Wolff
Attorney, Agent, or Firm—Oliff & Berridge

[57] ABSTRACT

A floating magnetic head used in a hard disk drive has a substantially rectangular slider made of a non-magnetic material. The slider has rails mounted on a surface of the slider that is opposite to a magnetic recording medium to produce a floating force. A cut-out is formed in the slider, for example, at one corner of the slider for providing access for winding a coil and a bridge spans the cut-out portion. A head core having a read/write gap is bonded to an outer periphery of the slider adjacent the cut-out portion. In particular, a winding portion of the head core is bonded to the bridge spanning the cut-out portion for receiving a portion of a winding coil. Accordingly, if a large force acts on the head core during winding of the coil or mounting of the floating magnetic head to a suspension, the head core can withstand the force without incurring damage or adversely affecting its ability to function.

4 Claims, 6 Drawing Sheets

FLOATING MAGNETIC HEAD WITH A HEAD CORE-REINFORCING PORTION

FIELD OF THE INVENTION

The present invention relates to improvements in a floating magnetic head used in a hard disk drive and, more particularly, to improvements in a floating magnetic head of the composite type.

BACKGROUND OF THE INVENTION

A floating magnetic head of the composite type which has been heretofore frequently used is generally indicated by reference numeral 1 in FIG. 8. This head 1 comprises a substantially rectangular slider 2 made of a nonmagnetic material of a high density such as calcium titanate ceramic. Rails 3 and 4 are mounted on the top surface of the slider 2 which is opposite to a magnetic recording medium (not shown) to produce a floating force. A slit 5 of a given depth is formed at one corner of the slider 2 which lies under one rail 3. The slit 5 extends in a direction perpendicular to the direction in which the medium moves. A thin head core 7 which has a read/write gap 6 and acts to read and write information to and from the medium is inserted in the slit 5. The core 7 is sealed by glass or other bonding means. One corner of the slider 2 is cut out to form a window 8 that permits winding of a coil 9. The window 8 extends along the rails 3 and 4 to two side surfaces of the slider 2. The coil 9 is wound on that portion of the head core 7 which faces the window 8.

The floating magnetic head of the composite type shown in FIG. 9 is disclosed in detail in copending U.S. application Ser. No. 08/059,297 to Egawa et al. head, indicated by 1a, comprising a thinned head core 7 to reduce eddy current loss at high frequencies. The head core 7 is adhesively bonded to the outer periphery of a nonmagnetic slider 2a. This floating magnetic head 1a is characterized in that the head core 7 can be thinned by a known machining technique such as grinding, lapping, or polishing after the core is bonded. This is permitted by the fact that one side of the core 7 is exposed. The head core 7 can be made thinner than the head core of the floating magnetic head 1 described already in connection with FIG. 8.

However, in the floating magnetic head 1a shown in FIG. 9, when the coil 9 is wound or the head is mounted to a suspension in a following step, or when the hard disk drive is mounted or otherwise treated, distortion or impact directly acts on the head core 7. As a result, the core 7 may get damaged or the characteristics may be deteriorated. Furthermore, the coil 9 on the head core embodiment shown in FIG. 9 has a tendency to be disarranged more easily than the floating magnetic head 1 shown in FIG. 8. The disarranged coil may come into contact with the disk, resulting in electrical leakage, breakage, or other trouble. In accordance with U.S. application Ser. No. 08/059,297, additional embodiments, for example, a bobbin (not shown) are used to prevent the coil from being disarranged or to prevent layer short between the wire of the core and the head core. If the bobbin is attached to the very thin head core, there arises the possibility that the core 7 is damaged.

SUMMARY OF THE INVENTION

It is an object of the present invention to provide a floating magnetic head in which the head core is reinforced to prevent the core from getting damaged and to prevent deterioration in the characteristics.

The above object is achieved by a floating magnetic head having a substantially rectangular slider made of a nonmagnetic material, rails mounted on the surface of the slider which is opposite to a magnetic recording medium to produce a floating force, a window formed at one corner of the slider for permitting winding of a coil, a head core having a read/write gap and bonded to the outer periphery of the slider around the window, the head being characterized in that it further includes at least one head core-reinforcing portion bonded to the head core so as to bridge the window, for reinforcing the core.

In this structure, the head core-reinforcing portion which bridges the window permitting the winding of the coil is bonded to the slider to reinforce the core. If a large force acts on the head core in a subsequent step such as winding of the coil or mounting to a suspension, the core can withstand the force.

Other objects and features of the invention will appear in the course of the description thereof which follows.

DETAILED DESCRIPTION OF THE INVENTION

Figure 1:
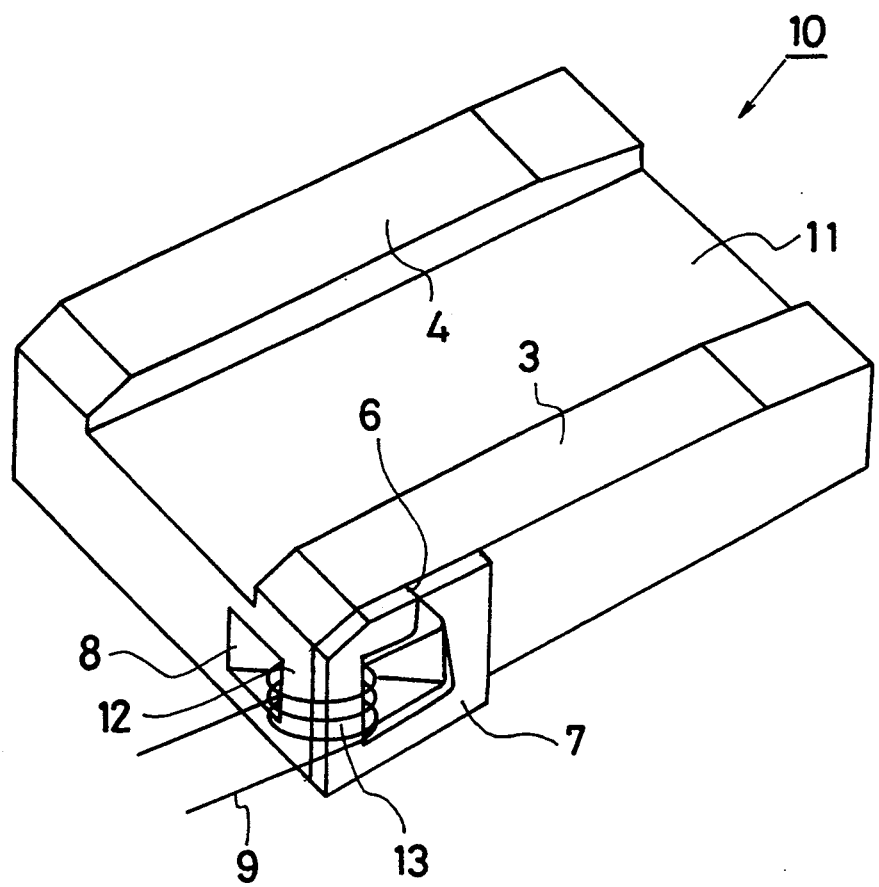
FIG. 1 is a perspective view of a first example of magnetic head according to the invention.
Figure 2:
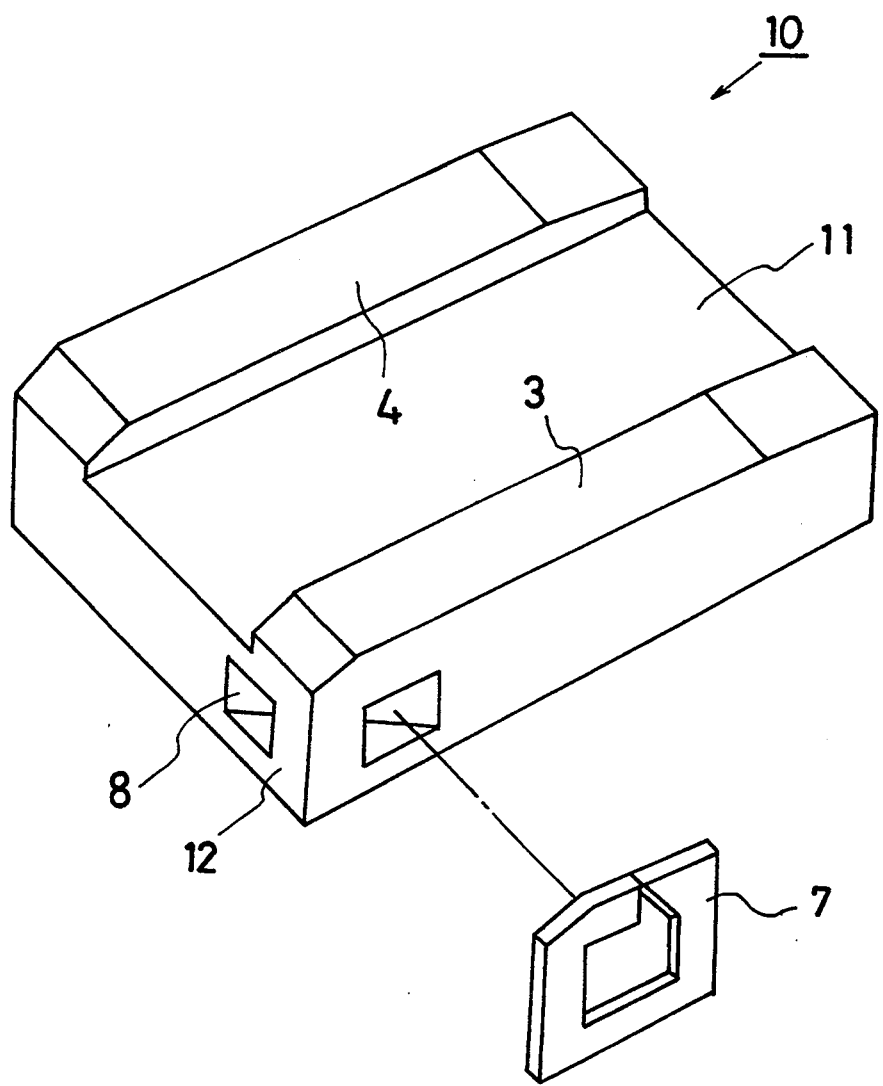
FIG. 2 is an exploded perspective view of the magnetic head shown in FIG. 1.

A first example of floating magnetic head according to the present invention is now described by referring to FIGS. 1 and 2. It is to be noted that like components are indicated by like reference numerals in various figures.

In FIG. 1, the floating magnetic head, generally indicated by numeral 10, has a substantially rectangular slider 11 made of a nonmagnetic material and having excellent mechanical characteristics. Rails 3 and 4 are mounted on the top surface of the slider 11 which is opposite to a magnetic recording medium (not shown) to produce a floating force. A window 8 is formed at one corner of the slider 11 that lies under one rail 3, to permit winding of a coil 9. A head core 7 having a read/write gap 6 acts to read and write information to and from the medium. The core 7 is bonded to the outer periphery of the slider 11 via a low-melting glass, an adhesive such as epoxy, or an eutectic metal such as Au—Sn or Au—Ge around the window 8. A head core-reinforcing portion 12 is bonded to the outer corner of the window 8 so as to bridge this corner. Thus, the core 7 is reinforced. The coil 9 is wound around the reinforcing portion 12 and around the winding portion 13 of the core 7 and faces the window 8, the winding portion 13 being bonded to the reinforcing portion 12.

The slider 11 is made of a nonmagnetic material which has excellent mechanical properties as described above. Preferably, the material of the slider 11 is so selected that this material is substantially identical in coefficient of thermal expansion with the core 7 in order that no distortion be left in the head core 7 when the slider is bonded to the core 7. Examples of this material include ceramics such as calcium titanate and barium titanate.

In the floating magnetic head 10 constructed in this way, the head core-reinforcing portion 12 is mounted to the slider 11 so as to bridge the window 8 permitting winding of a coil. Therefore, the core 7 is reinforced with the reinforcing portion 12. Therefore, if a large force acts on the head core 7 in a subsequent step such as winding of the coil 9 or mounting to a suspension, the core 7 can withstand the force. Consequently, the head core 7 is prevented from becoming damaged. Concomitantly, deterioration in the characteristics is prevented.

Figure 8:
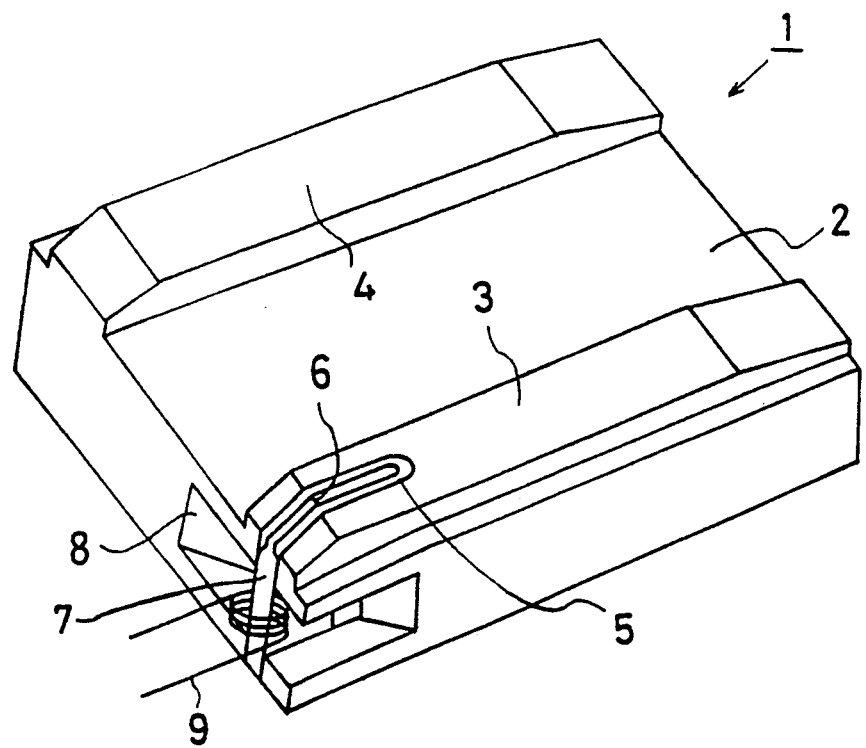
FIG. 8 is a perspective view of a conventional floating magnetic head.
Figure 9:
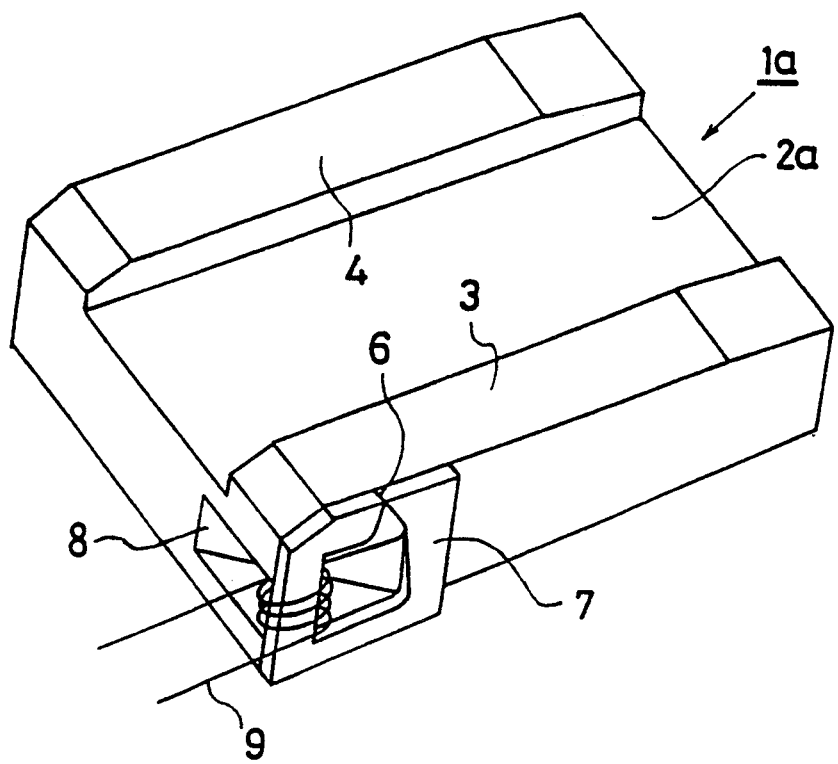
FIG. 9 is a perspective view of an embodiment of a floating magnetic head disclosed in copending U.S. application Ser. No. 08/059,297.

Furthermore, it is not necessary to form the thin slit 5 shown in FIG. 8 in the slider 11, because the head core 7 is mounted to the outer periphery of the slider 11. In addition, the head core 7 can be made much thinner than the head core of the floating magnetic head shown in FIG. 8, since the core 7 can be made thin after it is bonded to the slider 11. In this way, a floating magnetic head which produces only a small amount of eddy current loss and can cope with high frequencies can be obtained. Where the head core 7 is machined into a thin form in this way, the effect of the distortion created by the machining on the head core 7 is reduced, because the slider 11 has the head core-reinforcing portion 12 as mentioned above. During the machining, the possibility that the core is damaged is reduced. For these reasons, floating magnetic heads can be manufactured with high production yield.

Figure 3:
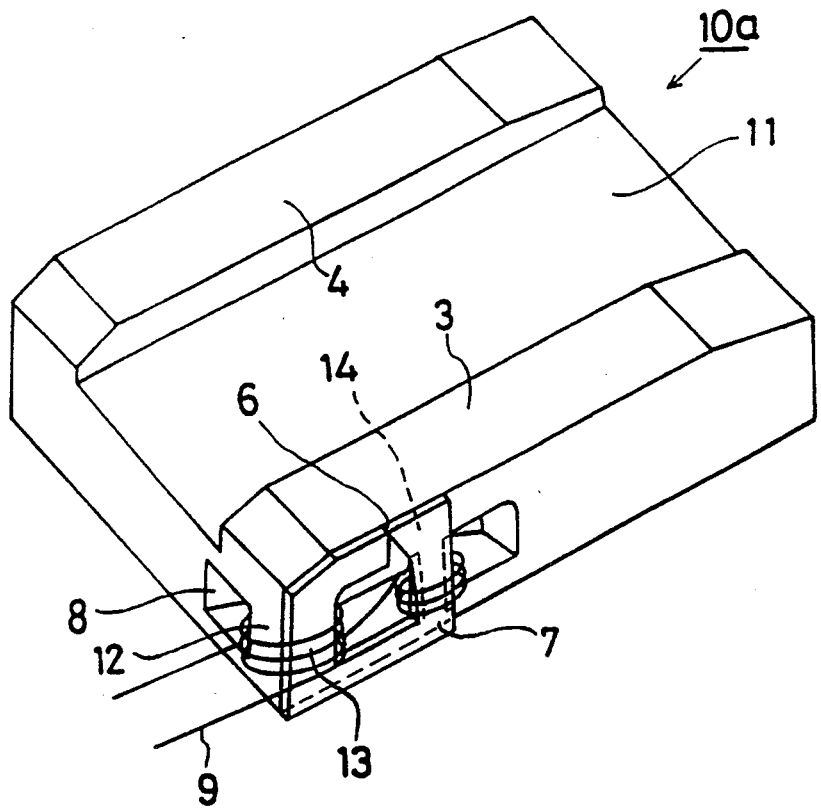
FIG. 3 is a perspective view of a second example of magnetic head according to the invention.

A second example of the invention is next described by referring to FIG. 3. This floating magnetic head, generally indicated by numeral 10a, is similar to the floating magnetic head 10 described already in conjunction with FIGS. 1 and 2 except that a head core-reinforcing portion 14 is formed in addition to the head core-reinforcing portion 12 and that the coil 9 forms balanced winding. The reinforcing portion 14 bridges the window 8 permitting winding of the coil along the rail 3. In this head 10a, the two head core-reinforcing portions 12 and 14 are bonded to the head core 7 and so the core 7 is reinforced with greater force than in the case of the first example. As a result, damage to the core 7 and deterioration in the characteristics can be prevented more effectively. Additionally, extraneous noise can be canceled out, because the coil 9 takes the form of balanced winding.

Figure 4:
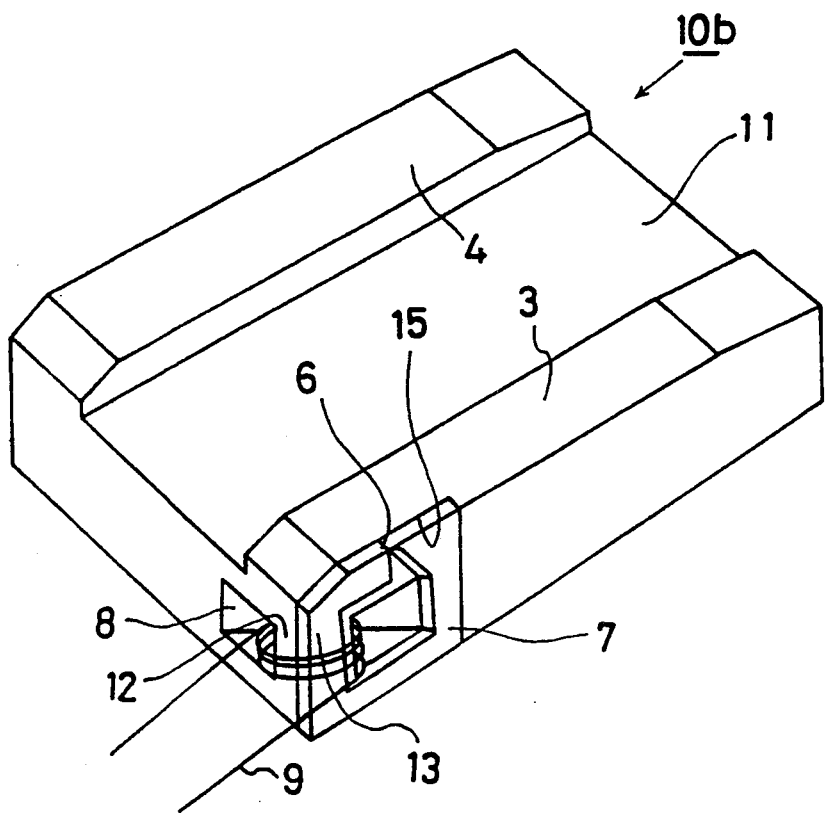
FIG. 4 is a perspective view of a third example of magnetic head according to the invention.

A third example of the invention is next described by referring to FIG. 4. This floating magnetic head, generally indicated by numeral 10b, is similar to the first example described in connection with FIGS. 1 and 2 except that a cutout 15 of the same dimension as the thickness of the head core 7 is formed at one corner of the slider 11 and that the core 7 is mounted in the cutout 15 so that the side surface of the core 7 and the side surface of the slider 11 may be flush with each other. This head 10b prevents damage to the head core 7 and deterioration in the characteristics by the reinforcing action of the head core-reinforcing portion 12 on the core 7, in the same way as the first example described above. Moreover, good balance is obtained under floating condition because the side surface of the head core 7 and the side surface of the slider 11 are flush with each other.

Figure 5:
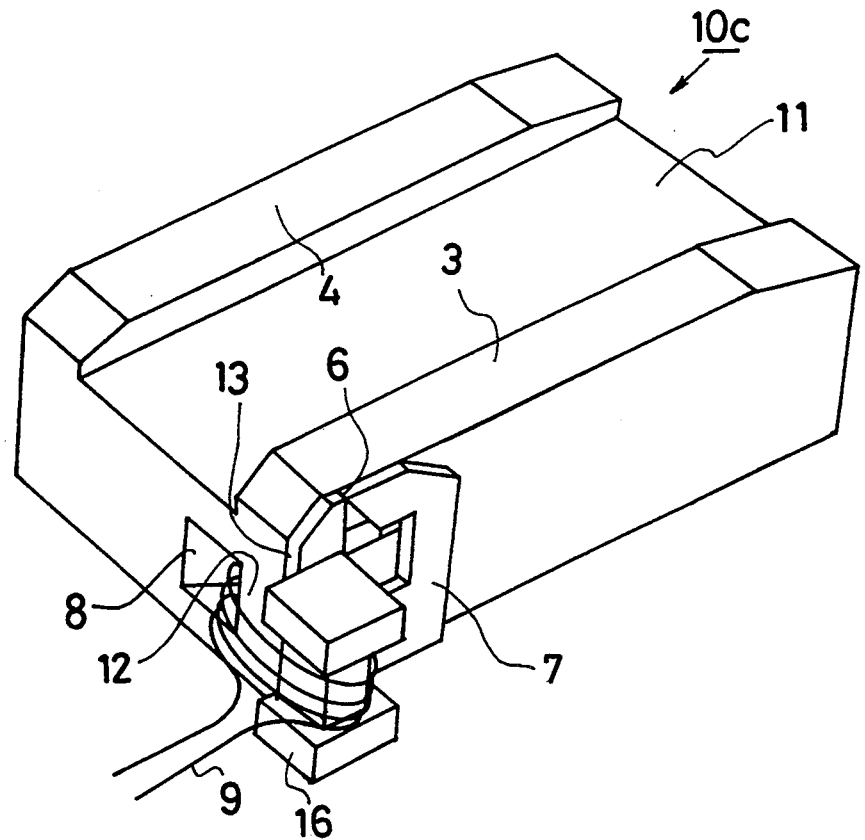
FIG. 5 is a perspective view of a fourth example of magnetic head according to the invention.

A fourth example of the invention is next described by referring to FIG. 5. This floating magnetic head, generally indicated by numeral 10c, is similar to the floating magnetic head described previously in connection with FIGS. 1 and 2 except that a bobbin 16 is mounted opposite to the head core-reinforcing portion 12 such that the winding portion 13 of the core 7 is sandwiched between the slider 11 and the bobbin 16. The coil 9 is wound around the bobbin 16 and around the head core-reinforcing portion 12.

This floating magnetic head 10c prevents damage to the head core 7 and deterioration in the characteristics by the reinforcing action of the head core-reinforcing portion 12 on the core 7, in the same way as the first example described above. In addition, the head 10c yields the following advantages. The winding portion 13 of the head core 7 is held between the head core-reinforcing portion 12 and the bobbin 16. Under this condition, the coil 9 is wound around the reinforcing portion 12 and around the bobbin 16. Therefore, the coil 9 is not in direct contact with the core 7. Hence, layer short is prevented. Also, the upper and lower ends (the top and the bottom as viewed in FIG. 5) of the coil 9 are prevented from being disarranged because the coil 9 is wound around the bobbin 16. Consequently, electrical leakage, breakage, and other trouble are prevented.

Figure 6:
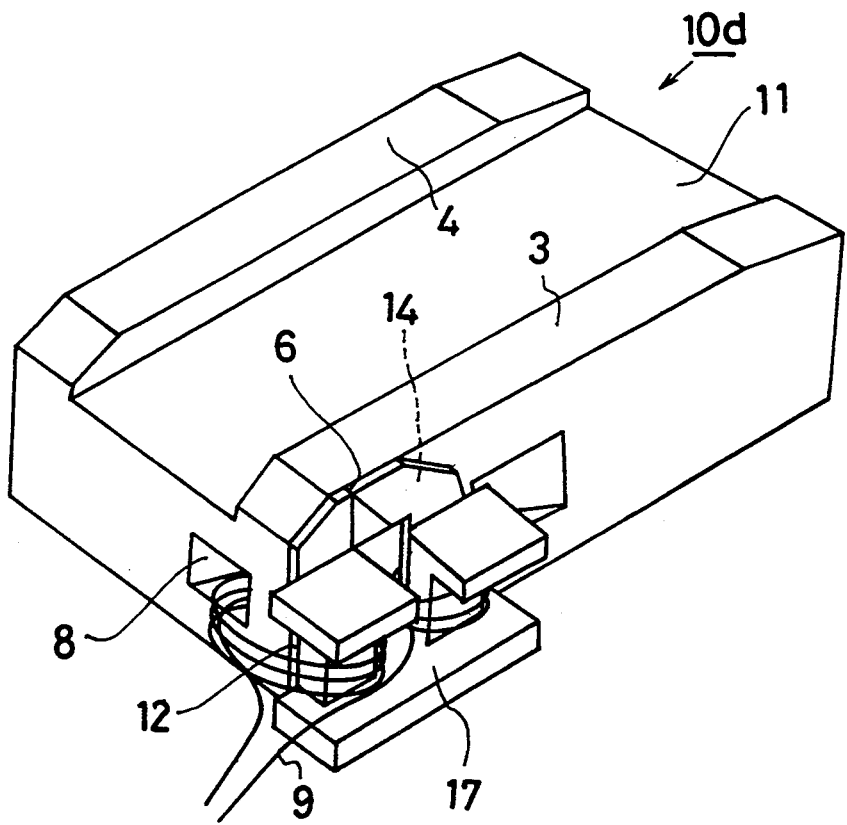
FIG. 6 is a perspective view of a fifth example of magnetic head according to the invention.

A fifth example of the invention is next described by referring to FIG. 6. This magnetic head, generally indicated by numeral 10d, is similar to the second example shown in FIG. 3 except that a dual bobbin 17 is mounted in an opposite relation to two head core-reinforcing portions 12. This head 10d prevents damage to the head core 7 and deterioration in the characteristics because the two reinforcing portions 12 and 14 reinforce the core 7 with greater force, and extraneous noise is canceled out by the balanced winding of the coil 9, in the same way as the second example. In addition, in the same way as the fourth example, layer short is prevented because the coil 9 is not in direct contact with the core 7. Also, the coil 9 is prevented from being disarranged because the upper and lower ends of the coil 9 are held down.

In each of the above examples, the slider 11 can be fabricated by injection molding, machining, or bonding. These fabrication methods are described next.

The slider 11 is manufactured by injection molding in the manner described now. First, 15 parts of a thermoplastic resin (e.g., polyvinyl butyral), 5 parts of a plasticizer (e.g., butyl phthalate), 60 parts of a solvent, and 1 part of a dispersant are added to 100 parts of a powdered ceramic such as calcium titanate. The mixture is kneaded at a high temperature to produce slurry. The slurry is introduced into a molding die of a desired form, thus obtaining a mold which conforms to the shape of the slider 11 shown in FIGS. 1 and 2. Then, the resinous component is dissolved and removed away at a temperature between 300° and 400° C. The mold is sintered at a temperature of 1350° to 1400° C. Thereafter, the mold is subjected to hot isostatic pressing to increase the density. In this way, the slider 11 shown in FIG. 2 is obtained.

Figure 7:
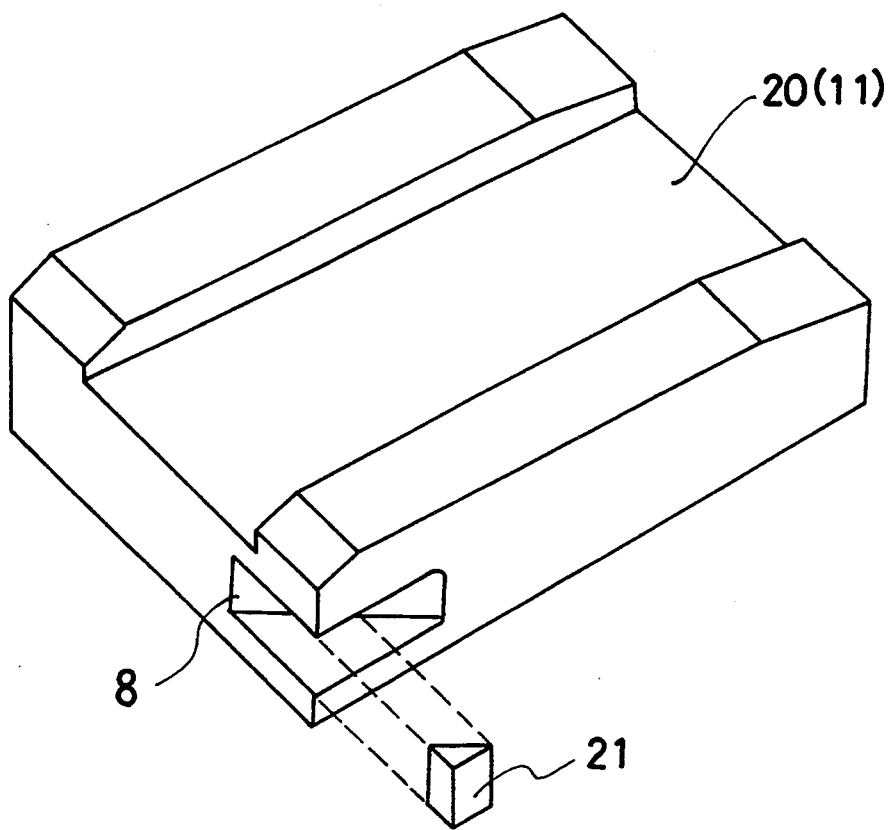
FIG. 7 is an exploded perspective view of a slider, for illustrating one method of fabricating the slider used in a floating magnetic head according to the invention.

The manner in which the slider 11 is manufactured by machining and bonding is next described by referring to FIG. 7. A member 20 from which the slider is robe fabricated is prepared. The member 20 has the rails 3 and 4 for producing a floating force. The member 20 is partially cut out to form the window 8 permitting winding. The head core-reinforcing member 21 which is shaped into a pillared form so as to bridge the window 8 is bonded via glass, a resinous adhesive, or other bonding techniques. As a result, the slider 11 shown in FIG. 2 is derived.

Since the novel floating magnetic head is constructed as described above, the head core is reinforced with one or more reinforcing portions. If a large force acts on the head core in a subsequent step such as winding of the coil or mounting to a suspension, the core can withstand the force. Consequently, the head core is prevented from becoming damaged. Concomitantly, deterioration in the characteristics is prevented.

What is claimed is:

1. A floating magnetic head, comprising:
   a slider of a nonmagnetic material having rails on a surface opposite a magnetic recording medium to produce a floating force, the slider having a recess located on an adjacent slider surface with at least one reinforcing portion spanning the recess; and
   a head core having first and second opposed surfaces and at least one winding portion, the first opposed surface being bonded on the adjacent surface of the slider abutting the recess and the reinforcing portion, wherein the at least one winding portion is bonded to the at least one reinforcing portion for receiving the coil winding of the head core, the second opposed surface being exposed along the slider surface.

2. The floating magnetic head according to claim 1, wherein the at least one winding portion comprises first and second legs of the head core and the first and second legs are bonded to first and second reinforcing portions on the slider.

3. The floating magnetic head according to claim 1, wherein a bobbin contacts the second opposed surface adjacent the at least one winding portion such that a portion of a winding coil is wound around a combination of the at least one reinforcing portion, the at least one winding portion and the bobbin.

4. The floating magnetic head according to claim 1, wherein the recess is in a corner of the slider.

* * * * *